UNITED STATES PATENT OFFICE.

ANDREW McDONALD, OF GLASGOW, COUNTY OF LANARK, SCOTLAND.

BAKING-POWDER.

SPECIFICATION forming part of Letters Patent No. 317,821, dated May 12, 1885.

Application filed December 29, 1883. (No specimens.) Patented in England October 3, 1883, No. 4,701.

*To all whom it may concern:*

Be it known that I, ANDREW MCDONALD, a citizen of the United Kingdom of Great Britain and Ireland, residing at Glasgow, in the county of Lanark, Scotland, have invented Improvements in Making Bread and in Baking-Powder and so-called "Prepared Flour" therefor; and I do hereby declare that the following is a full, clear, and exact description of the invention, which will enable others skilled in the manufacture or art to which it relates to make and use the same.

This invention relates to improvements in the art or process of making bread, cakes, biscuits, and the like, and in baking-powder and so-called "prepared flour" to be used therefor.

Hitherto, in making bread, cakes, biscuits, and the like, and in the preparation or manufacture of baking-powder and of so-called "prepared flour" to be used for that purpose, cream of tartar or tartaric acid has been used. These substances form a salt difficult to dissolve, and which I consider to be injurious to the system. Instead of cream of tartar or tartaric acid, I use in the process the acid or bisulphate of potash or of soda—the acid or bisulphate of potash, by preference—as I find these acids or bisulphates, besides being much cheaper, are much more easily dissolved than the salts of cream of tartar and of tartaric acid. The acid or bisulphate of potash or of soda, which, for the purposes of this invention, are preferably used in the anhydrous state of these salts, may be obtained in any suitable way and amalgamated either with the flour or with the dough in the manner in which cream of tartar or tartaric acid has hitherto been used.

As compared with the proportions of the other ingredients in the process of making the bread, cakes, biscuits, or the like, the proportion of bisulphate used may be as follows, namely: to eight pounds of flour and one ounce of bicarbonate of soda or of potash, one ounce of bisulphate of potash or of soda; or, if buttermilk or sour milk is used in making the bread, cakes, or the like, to seven pounds of flour and one ounce of bicarbonate of soda or of potash, half an ounce of bisulphate of potash or of soda, either mixed with the flour or with the dough.

When mixed with other ingredients so as to constitute a baking-powder, the proportions of bisulphate may be as follows, namely: with one to two ounces of rice-flour, farina, or other flour and one ounce of bicarbonate of soda or of potash, one to one and one-half ounce of bisulphate of potash or of soda.

For making prepared flour the proportions may be as follows, namely: to eight pounds of flour and one ounce of bicarbonate of soda or of potash, one to one and one-half ounce of bisulphate of potash or of soda.

It is obvious that instead of the bicarbonate of soda or of potash carbonate of these substances may be used with any of the foregoing modes of using bisulphate of potash or of soda, in which case about double the quantity of carbonate as compared with bicarbonate would be required.

It is to be understood that although I have given the above proportions of the bisulphates as being those which I find well adapted and satisfactory for general use, I do not confine myself to them, and that they may be modified without departing from the main or essential features of my said invention, which are in the making of bread, cakes, biscuits, and the like, and of baking-powder and prepared flour, to provide a cheap substitute for cream of tartar or tartaric acid, and one whose salts are more easily dissolved than the salts of these substances.

Generally wherever bisulphate of potash or of soda is substituted for cream of tartar half the quantity of the bisulphate, as compared with cream of tartar, will suffice, and when the bisulphates are employed instead of tartaric acid they may be used in quantities equal to the quantities used of that latter substance.

The acid bisulphate of potash for employment under this invention may be obtained in any of the usual methods; but it is preferred to procure it by treating pure nitrate of potash with sulphuric acid in manufacturing nitric acid or vitriol. The by-product thus obtained is a pure acid bisulphate of potash, which, after being ground to a powder by any suitable means, is ready for use. Pure nitrate of soda may be treated in the same way with sulphuric acid, thus producing a by-product of pure acid bisulphate of soda, which, after being ground to a powder, is ready for use. These by-products (bisulphate of potash and of soda) may be crystallized either with or without the addition of sulphuric acid.

When crude materials are used in the manufacture of nitric acid or vitriol, the by-products (bisulphate of potash and of soda) may be crystallized in the same way to remove impurities.

Under another mode the neutral sulphates of potash and of soda may be fused with sufficient sulphuric acid added to produce bisulphates or acid sulphates of potash and soda, for the purposes of this invention, and in some cases it may be found advantageous to use the soda and potash bases in combination—in other words, a double salt of bisulphate of potash and soda, which may be obtained as hereinbefore described or otherwise.

When the bisulphate of soda is used, and when it is not in the form of baking-powder or prepared flour, as it is more deliquescent than the potash salt, in order to preserve it in a proper condition for its employment, it is preferably mixed with a sufficient quantity of rice-flour or farina to prevent it caking.

Having now described the said invention, I do not claim any mode of manufacturing bisulphate of potash or of soda, nor do I confine myself to the use of these bisulphates when obtained by the modes hereinbefore described; but

What I do claim, and desire to secure by Letters Patent, is—

1. A baking compound consisting of bisulphate of potash or of soda and carbonate, bicarbonate, or sesquicarbonate of potash or of soda, in proportions specified.

2. A baking compound consisting of bisulphate of potash or of soda, carbonate, bicarbonate, or sesquicarbonate of potash or of soda and flour.

In testimony whereof I have hereunto set my hand and seal this 14th day of December, 1883.

ANDREW McDONALD. [L. S.]

Witnesses:
   GEO. M. CRUIKSHANK, *C. E.*,
     *Fellow Institute of Patent Agents,*
       135 *Buchanan St., Glasgow.*
   J. J. A. CRUIKSHANK,
       135 *Buchanan St., Glasgow.*